Figure 1:
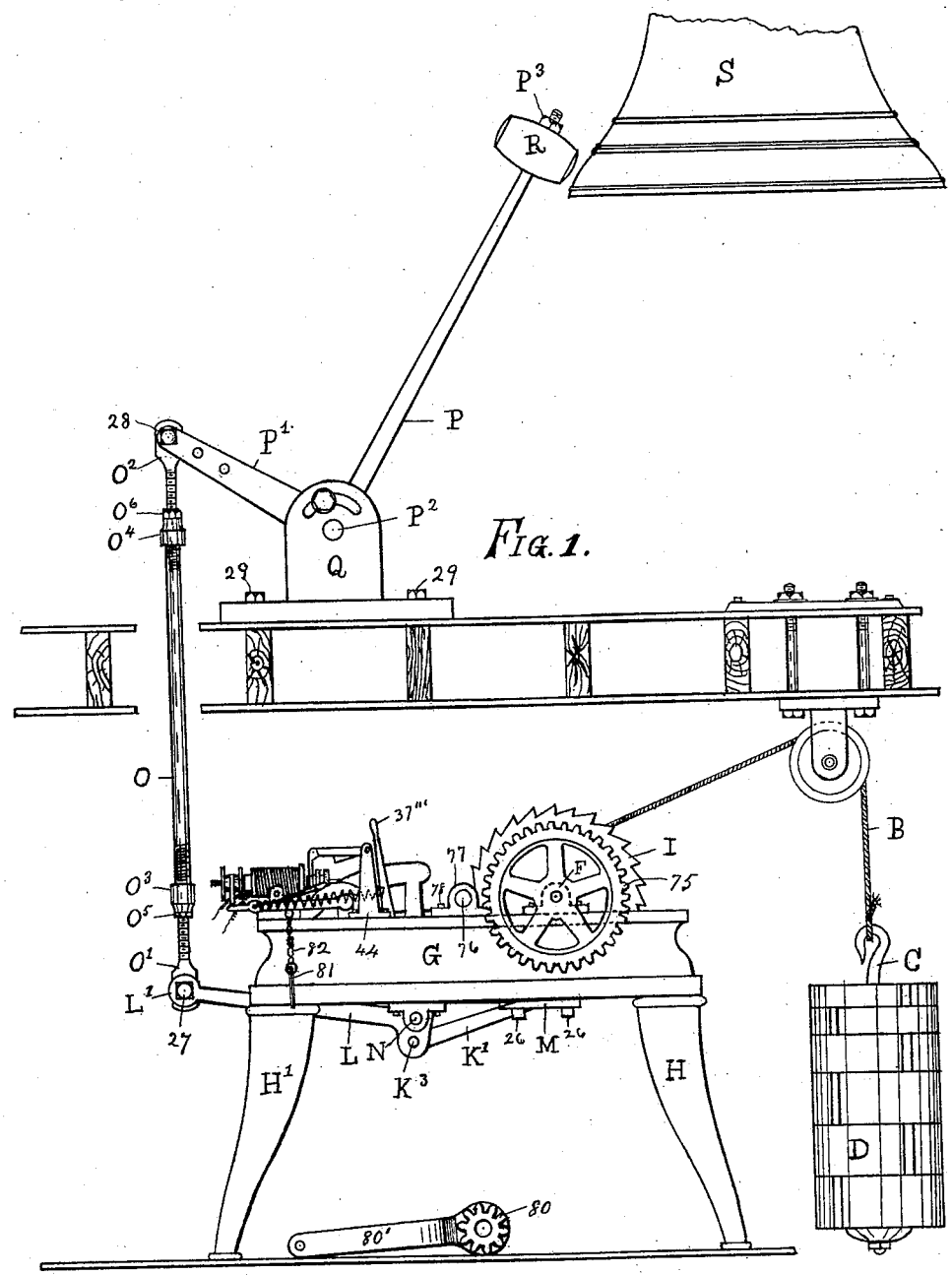

(No Model.)

T. F. GAYNOR.
ELECTRO MECHANICAL BELL STRIKING MACHINE.

No. 408,968. Patented Aug. 13, 1889.

7 Sheets—Sheet 1.

WITNESSES.
E. H. Stephens
T. F. O'Brien

INVENTOR.
Thomas F. Gaynor

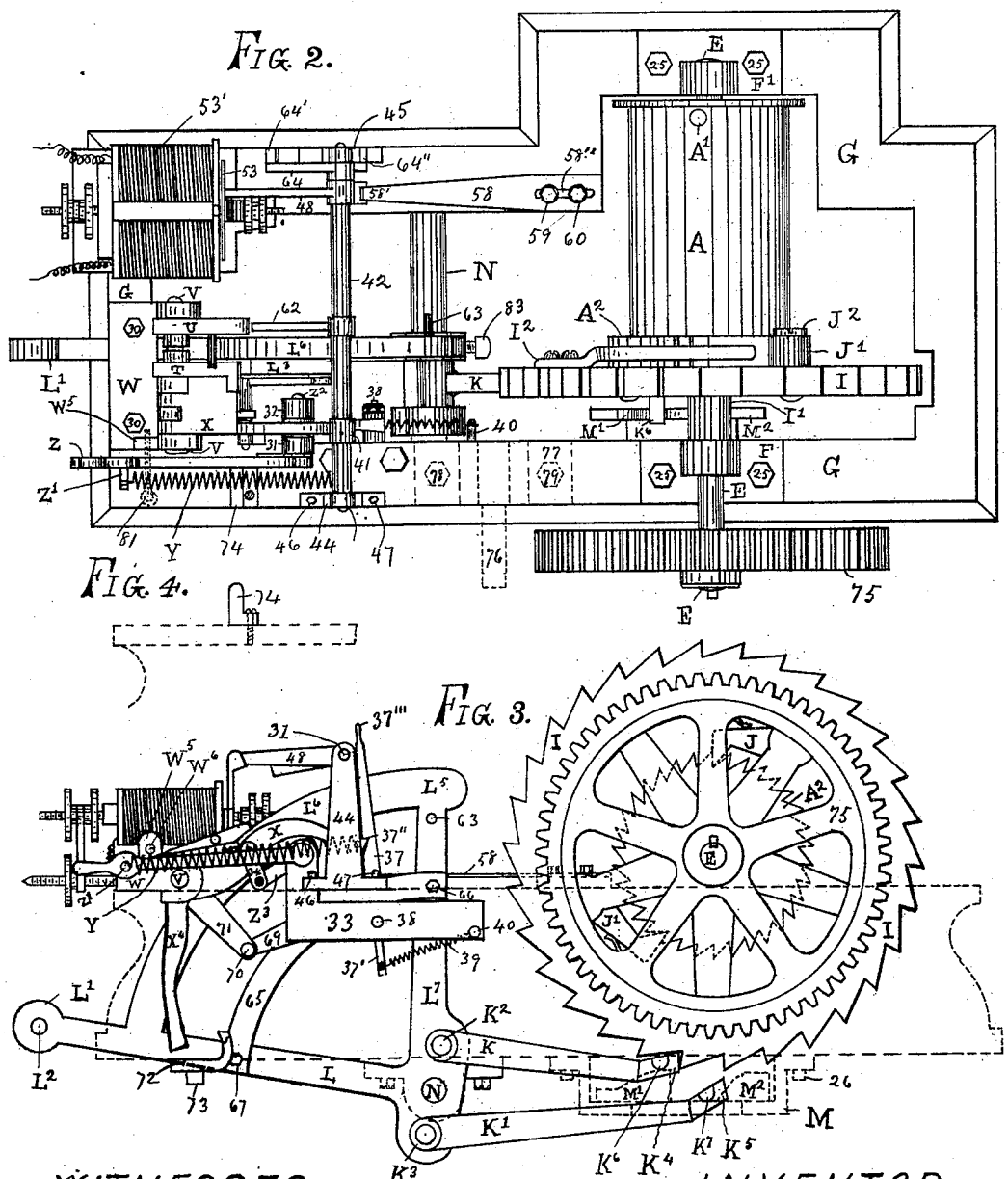

(No Model.) 7 Sheets—Sheet 3.
T. F. GAYNOR.
ELECTRO MECHANICAL BELL STRIKING MACHINE.
No. 408,968. Patented Aug. 13, 1889.
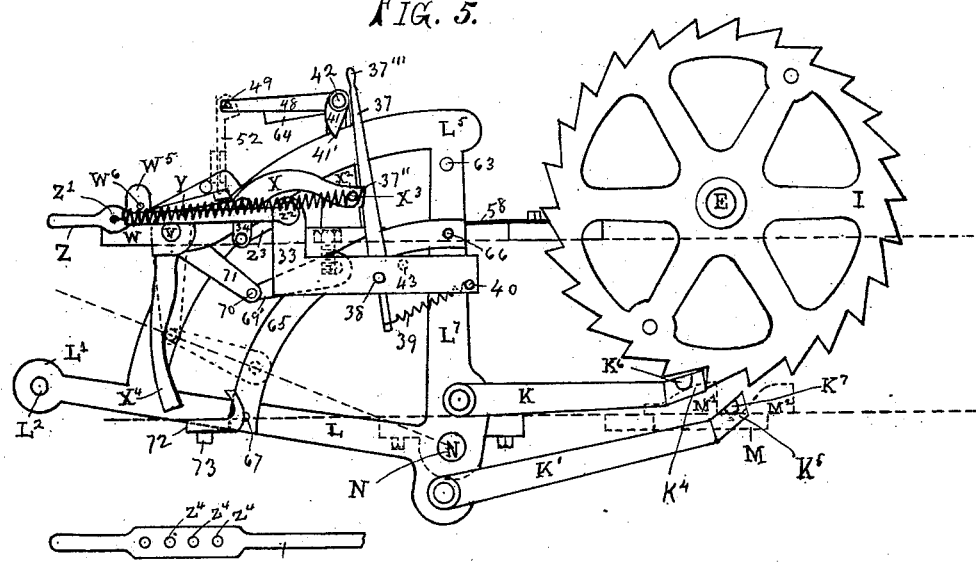
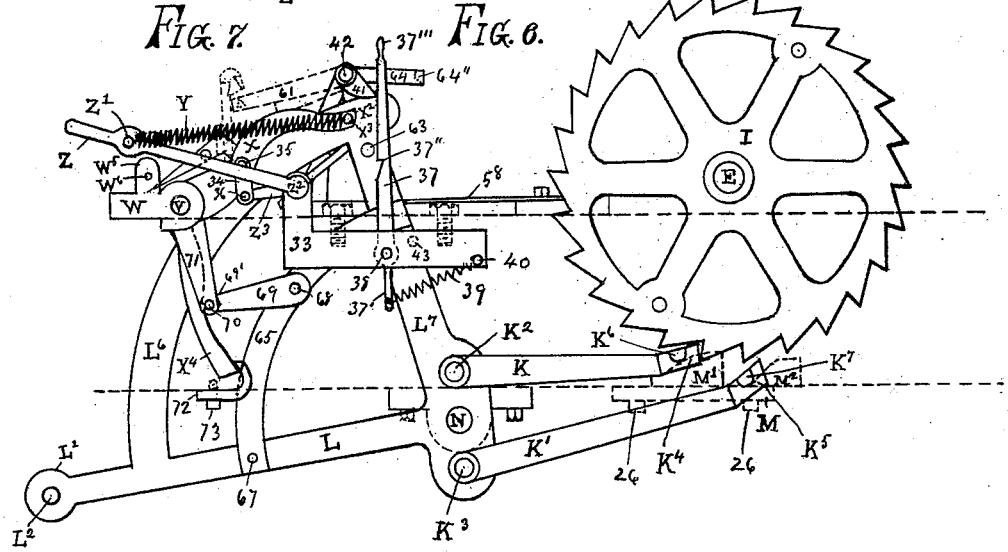
WITNESSES.
E. W. Stephens
T. F. O'Brien
INVENTOR.
Thomas F. Gaynor (No Model.)  7 Sheets—Sheet 4.

T. F. GAYNOR.
ELECTRO MECHANICAL BELL STRIKING MACHINE.

No. 408,968. Patented Aug. 13, 1889.

WITNESSES.
E. H. Stephens
T. F. O'Brien

INVENTOR.
Thomas F. Gaynor.

(No Model.)  7 Sheets—Sheet 5.

T. F. GAYNOR.
ELECTRO MECHANICAL BELL STRIKING MACHINE.

No. 408,968.  Patented Aug. 13, 1889.

WITNESSES.  INVENTOR.
E. H. Stephens.  Thomas F. Gaynor
T. F. O'Brien (No Model.)  7 Sheets—Sheet 6.

T. F. GAYNOR.
ELECTRO MECHANICAL BELL STRIKING MACHINE.

No. 408,968.  Patented Aug. 13, 1889.

WITNESSES.
E. H. Stephens.
T. F. O'Brien

INVENTOR.
Thomas F. Gaynor (No Model.) 7 Sheets—Sheet 7.
T. F. GAYNOR.
ELECTRO MECHANICAL BELL STRIKING MACHINE.
No. 408,968. Patented Aug. 13, 1889.
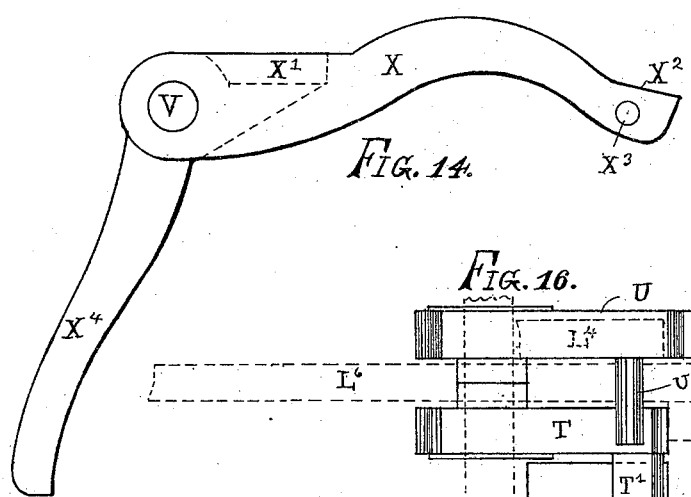
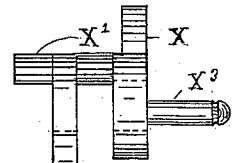
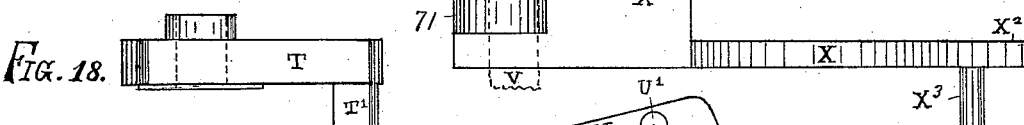
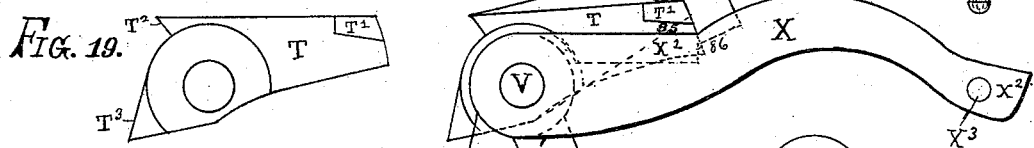
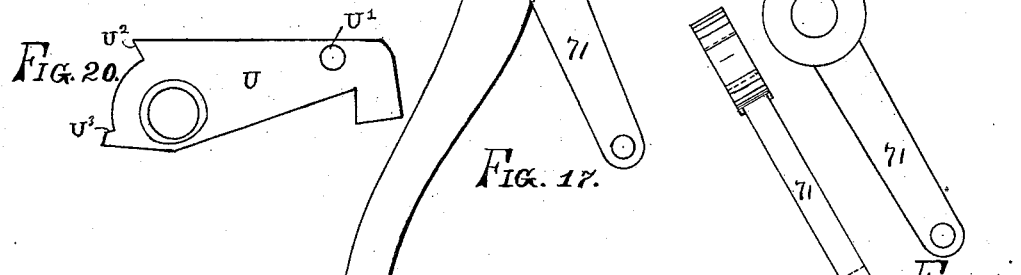
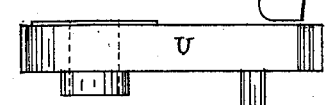
WITNESSES.
E. H. Stephens
T. P. O'Brien
INVENTOR.
Thomas F. Gaynor

UNITED STATES PATENT OFFICE.

THOMAS F. GAYNOR, OF LOUISVILLE, KENTUCKY, ASSIGNOR TO THE GAYNOR ELECTRIC COMPANY, OF SAME PLACE.

ELECTRO-MECHANICAL BELL-STRIKING MACHINE.

SPECIFICATION forming part of Letters Patent No. 408,968, dated August 13, 1889.

Application filed June 6, 1889. Serial No. 313,398. (No model.)

*To all whom it may concern:*

Be it known that I, THOMAS F. GAYNOR, a citizen of the United States, residing at Louisville, in the county of Jefferson and State of Kentucky, have invented a new and useful Improvement in Electro-Mechanical Bell-Striking Machines, of which the following is a specification.

My invention relates to improvements in electro-mechanical machines for striking bells of fire-alarms, fog-alarms, tower-clocks, and the like.

My invention belongs to that class of bell-striking machines in which the bell-striking hammer is actuated by the power of a suspended weight transmitted through the medium of the machine and regulated by the action of the armature of an electro-magnet upon the tripping mechanism of said machine.

The object of my invention is to provide a machine with a tripping mechanism which can be operated with a minimum of battery-power expended in moving the armature of an electro-magnet.

My object is also to provide a machine with a lock-stop mechanism which will securely lock the moving parts of the machine in a stationary position when the machine is not striking a signal on the bell, and at the same time so constructing the lock-stop mechanism that it will release the moving parts of the machine for operation with the least possible loss of time and expenditure of mechanical power, and also after a blow has been struck upon the bell by the hammer that the moving parts of the machine will be locked again as rapidly as possible, so that the machine will be ready to strike the next blow without loss of time.

My object is further to provide a safety-catch for the machine, so that if a signal should be sent through the electro-magnet while a person was in the act of winding up the weight said signal would not cause the tripping-lever to operate while such winding was being done.

I attain these objects by the mechanism illustrated in the accompanying drawings, in which—

Figure 8:
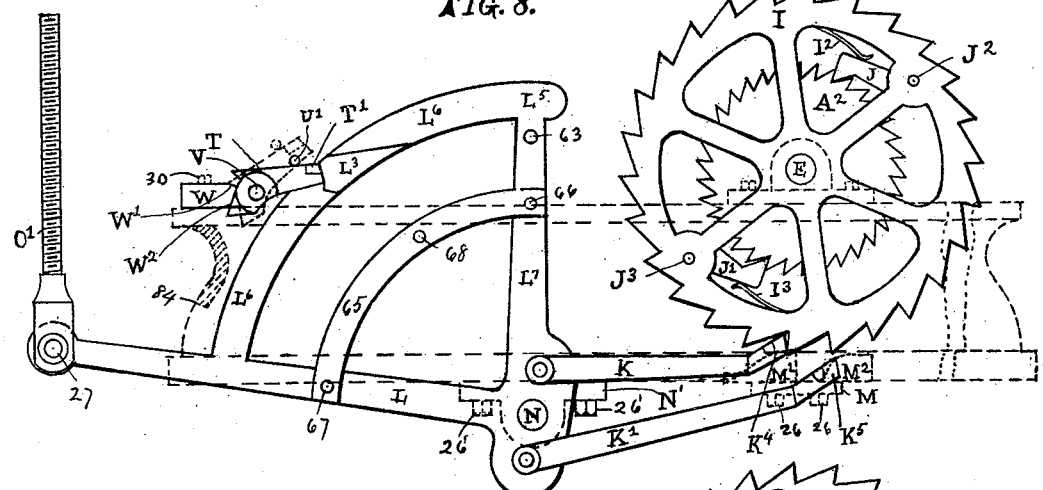
Figure 9:
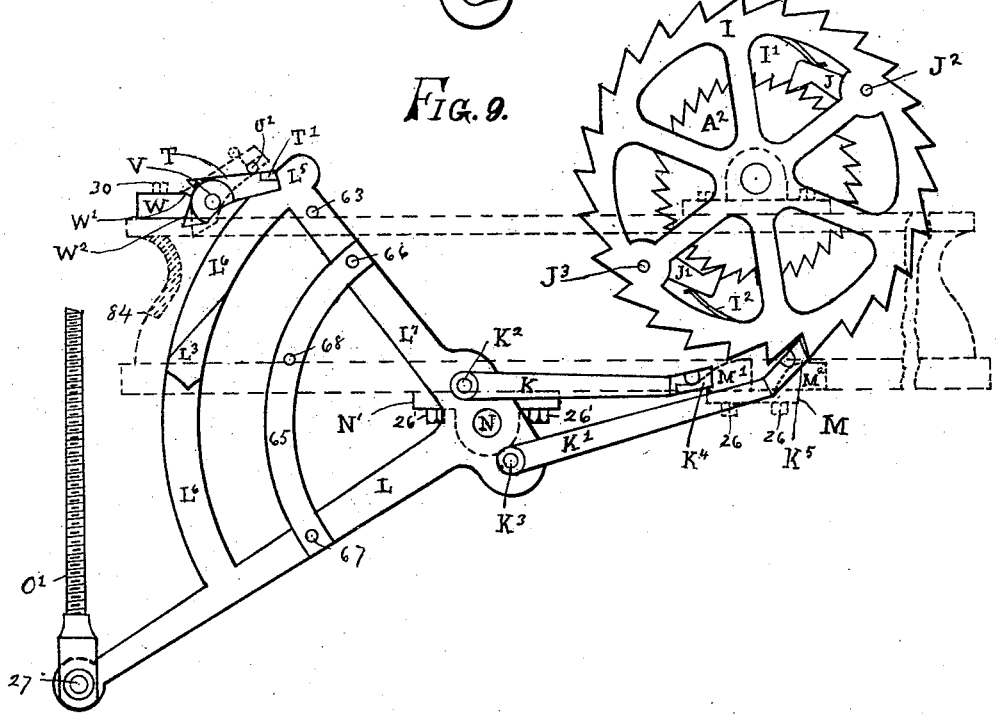
Figure 10:
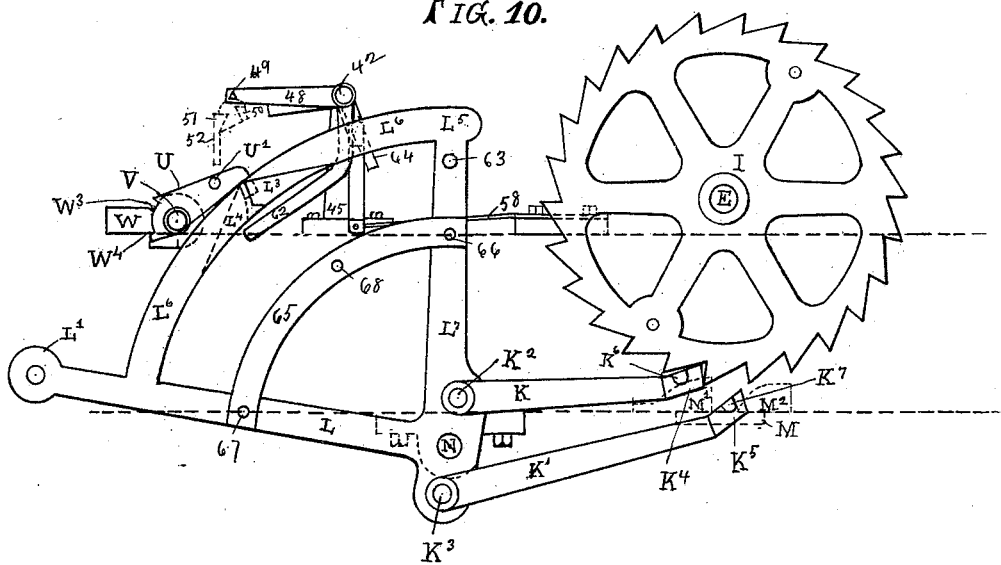
Figure 11:
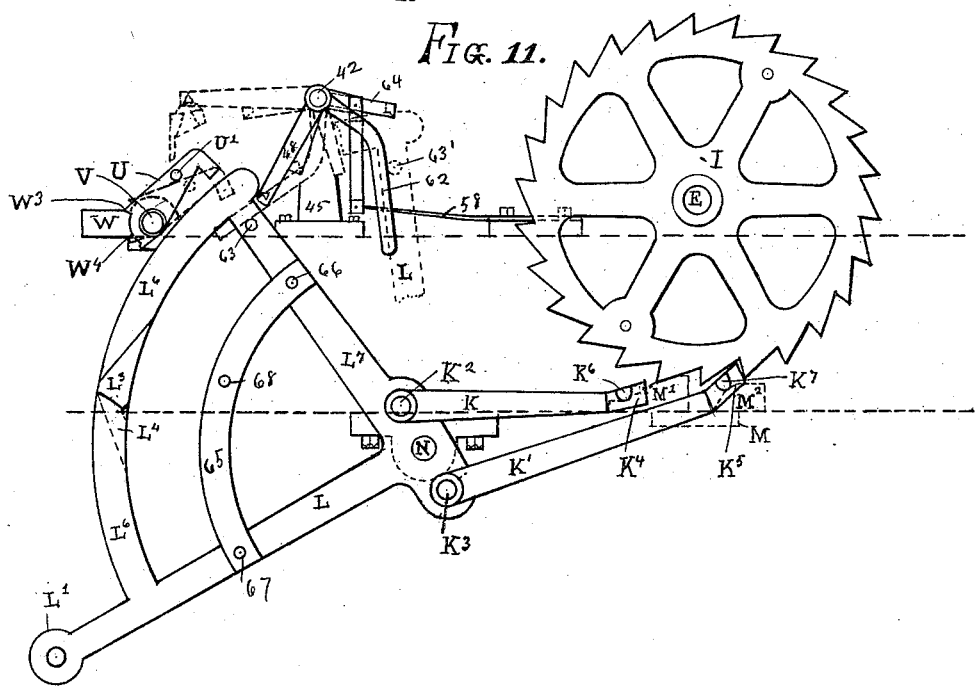
Figure 12:
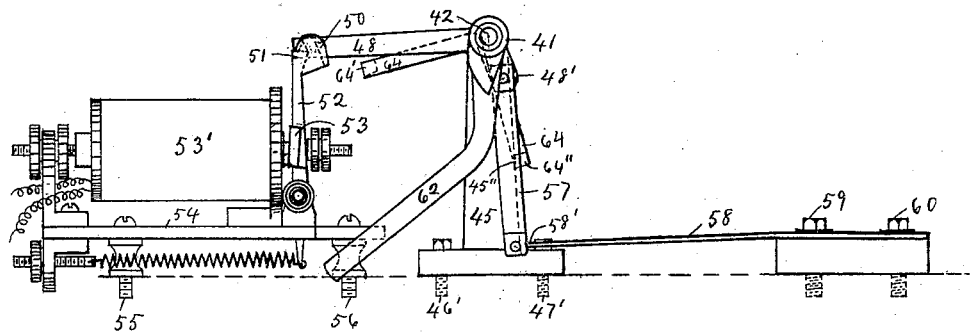
Figure 13:
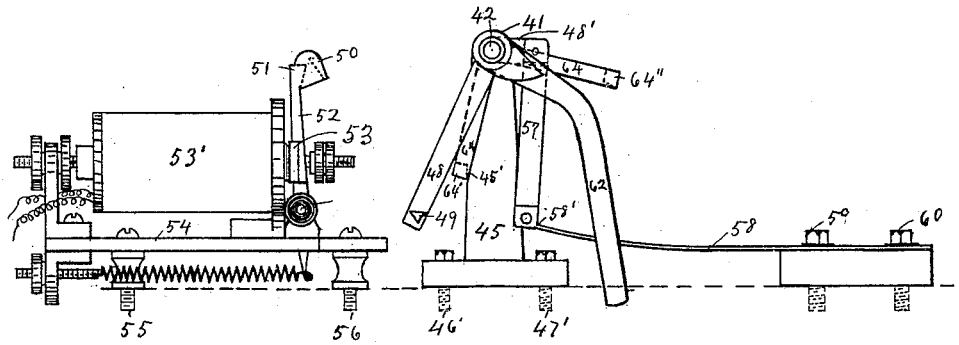

Figure 1 is a front elevation of the machine connected with a bell-striking hammer mechanism, which is fully described in my application for Letters Patent for an improvement in bell-striking apparatus of even date herewith, Serial No. 313,396. Fig. 2 is a top elevation of a part of the machine. Fig. 3 is a front elevation of the moving parts of the machine. Fig. 4 shows a front elevation of a spring-block, a detail in Fig. 2. Fig. 5 is a front elevation of the moving parts of the machine when at rest preparatory to the reception of the signal. Fig. 6 is a front elevation of the moving parts of the machine seen in Fig. 5 after a signal has been received through the electro-magnet and after the working parts have made about one-fourth of the complete movement necessary to a blow on the bell. Fig. 7 is a front view of a means of adjustment for the mainspring of the tripping-lever mechanism. Fig. 8 shows a front elevation of the main lever, the main pawl, and the main stop in relation to each other when the machine is at rest. Fig. 9 is a front elevation of the parts shown in Fig. 8 after the main lever has made a downward movement. Fig. 10 is a front elevation of a part of the machine, showing a secondary pawl, a stop projection, and a rock-shaft mechanism, the main lever being up at its normal position. Fig. 11 is a front elevation of the parts represented in Fig. 10 after the main lever has been released and has made a downward stroke. Figs. 12 and 13 are front elevations of the electro-magnet with its armature and the rock-shaft mechanism before and after the magnet has been energized. Fig. 14 is a front elevation, of enlarged size, of the tripping-lever. Fig. 15 is an end elevation of Fig. 14. Fig. 16 is an enlarged top view of the tripping-lever and of the main and secondary pawl in position with reference to each other. Fig. 17 shows a side elevation of Fig. 16. Fig. 18 is an enlarged top view of the main pawl. Fig. 19 is a front view of Fig. 18. Fig. 20 is an enlarged front view of the secondary pawl. Fig. 21 is a top view of Fig. 20. Fig. 22 is an enlarged end view of a rocking lever forming part of the rock-shaft restoring mechanism. Fig. 23 is a front view of Fig. 22.

Similar letters and figures refer to similar parts throughout the several views.

A represents a cylinder or drum, to which one end of the cable B is attached by means of a hole A', and upon which it is wound. The other end of the cable is attached to a rod C, carrying the weight D, as shown. The drum A is secured by means of a key (not shown) to the shaft E in the ordinary manner, and requires no further explanation. The shaft E is fitted to boxes F F', which are attached to the bed G of the machine by means of bolts 25 25. The bed G of the machine is supported by legs H H', which are bolted to the bed in the customary manner, and by which the machine may be secured to its foundation, like similar machines of its class. The drum A is provided with a ratchet-wheel $A^2$ upon one end.

I represents a pallet-wheel, which is loosely fitted upon the shaft E, and is provided with a hub I', which keeps the pallet-wheel I against the ratchet-wheel $A^2$. The pallet-wheel I is provided with two pivots $J^2$ $J^3$, which carry the ratchet-pawls J J'.

$I^2 I^3$ represent springs screwed upon the side of said pallet-wheel, which bear upon and keep said ratchet-pawls in engagement with the teeth of the ratchet-wheel.

The teeth of the pallet-wheel I impinge against two pallets K K', which are loosely pivoted to the main lever L upon pivots $K^2$ $K^3$. The free ends $K^4$ $K^5$ of the pallets K K' are supported by a rest M, which is bolted to the bed of the machine by means of the bolts 26 26. The rest M is of such shape as to cause the pallets K K' to come against the teeth of the pallet-wheel I when said pallets move forward toward the teeth of the pallet-wheel and to drop away therefrom when these conditions are reversed.

The cable B is wound upon the drum A in such a manner as to cause the pressure of the weight D to come against the ends $K^4$ $K^5$ of the pallets K K' through the teeth of the pallet-wheel, and thereby transmits a leverage upon the main lever L above or below the center of the shaft N, upon which the lever L is secured. The shape of the pallet-rest M is such that at no time during the movement of the machine can there be but one pallet out of mesh with the teeth of the pallet-wheel, so that it is impossible for the pallet-wheel to rotate more than one tooth with each complete movement of the main lever L. Each of the pallets K K' is provided with a spur $K^6$ $K^7$, which slides upon a lug M' $M^2$ of the rest M, and by which the pallets are thrown into mesh with and allowed to fall away from the pallet-wheel teeth during the operation of the machine.

The momentum of the moving parts of the machine and the hammer is such as to slightly reverse the movement of the pallet-wheel at the end of each oscillation of the main lever. When this reversal of the pallet-wheel occurs, the pallet which has completed its stroke becomes entirely clear of contact with the corresponding tooth of the pallet-wheel when it drops down by gravity upon the rest M. While the other pallet is completing its stroke, and while said first pallet is clear of the tooth which propelled it, said tooth passes clear over the free pallet and allows said free pallet to impinge against the next oncoming tooth, against which it is brought up by its forward movement upon the inclined lug upon which its spur rests. The momentum of this second oscillation of the main lever carries the end of the free pallet so forcibly against the oncoming tooth as to cause a second reversal of the pallet-wheel, which liberates the acting pallet, which drops down, as the first pallet had done, clear of contact with the propelling-tooth of the pallet-wheel, thus completing the full movement of the main lever. This operation is repeated every time a stroke is given upon the bell.

The main lever L extends out beyond the end of the machine and terminates in an enlarged end L', having a hole $L^2$, through which a bolt 27 passes and by which the connecting-rod O is pivoted. Each of the ends of the connecting-rod O is provided with an eyebolt O' $O^2$, having a socket-nut $O^3$ $O^4$ and a check-nut $O^5$ $O^6$, by the adjustment of which the length of the connecting-rod O is regulated. The upper end of the connecting-rod O is pivoted through the eyebolt $O^2$ to the arm P' of a hammer-lever P upon the bolt 28. The hammer-lever P is pivoted upon a shaft $P^2$. Said shaft $P^2$ is pivoted in bearings in two standards, one of which standards is seen at Q in Fig. 1.

The hammer-lever P has a hammer R secured to its free end by means of a nut $P^3$, screwed upon the threaded end of the hammer-lever. The hammer-lever mechanism is adapted to be secured to a floor or other suitable support by means of the lag-screws 29 29 in such a position with reference to the bell S as to cause the bell to be struck at the proper point by the hammer R at the end of each forward oscillation of the hammer-lever. This bell-striking apparatus is more fully described in my application for Letters Patent for an improvement in bell-striking apparatus, Serial No. 313,396, of even date herewith. The main lever L has an extension in the form of a quadrant $L^6$ $L^7$, the arc $L^6$ of which is provided with two stop projections $L^3$ $L^4$. (Seen in Figs. 8, 9, 10, and 11.) One of these stop projections extends laterally upon each side of the arc $L^6$ of the quadrant, with which they are integral. The shape of these stop projections is somewhat similar to that of the teeth of a ratchet-wheel, and they are adapted to impinge against two pawls T U, which are pivoted upon a shaft V, which shaft is secured to the bed G of the machine through the shaft-holder W, which is secured to the bed of the machine by means of the bolts 30 30. The position of this shaft V with reference to the stop projections $L^3$ $L^4$ is such as to allow the pawls T U to come against the faces of the said stop projections $L^3$ $L^4$ after the manner of a pawl with the teeth of a ratchet-wheel. The pawl U is, however, made in the form of a hook, and the corresponding stop projection is of such a form as to have its face abut against the inner face of said hook-shaped pawl U. By this construction of stop projections and pawls it can be seen that when both of the pawls are down in position against the stop projections the hammer-lever can be moved neither up nor down, because it becomes securely locked in a stationary position, thus preventing the machine from operating.

The straight pawl T is provided with a lifting-lug T', and the hook-shaped pawl U is provided with a lifting-pin U', which extends over the top of the straight pawl T. By this construction it can be seen that the hook-shaped pawl U can be lifted up out of mesh with its stop projection without lifting the straight pawl T; but the straight pawl T cannot be lifted without lifting the hook-shaped pawl U.

The movement of the pawls T U is only a little more than enough to allow them to clear the stop projections, when they are lifted up out of mesh with the latter, and the downward movement of the pawls is only enough to allow their faces to impinge solidly against the faces of the stop projections. These movements are limited by the shoulders $T^2$ $T^3$ and $U^2$ $U^3$ of the pawls, as seen in Figs. 19 and 20. These shoulders strike against corresponding seats in the shaft-holder W. (Seen at W' $W^2$ $W^3$ $W^4$ in Figs. 8, 9, 10, and 11.)

Upon the pawl-shaft V a tripping-lever X is pivoted, which is provided with a tripping-shoulder X', which is adapted to strike against the lifting-lug T', and through the same to lift the pawls T U out of mesh with the stop projections of the main lever L, and thus allow the machine to strike a blow. The end $X^2$ of the tripping-lever X is provided with a pin $X^3$, to which a spring Y is attached at one end. The other end of the spring Y is attached to a spring-lever Z by means of a pin Z'. The spring-lever Z is provided with a pivot-shaft $Z^2$, Fig. 2, which is journaled in bearings 31 32, Figs. 2, 3, 5, and 6, in a bracket 33, which is bolted to the bed of the machine. The spring-lever shaft $Z^2$ has an arm $Z^3$, which is linked to the tripping-lever by means of two links having link-pins 35 36, one of which is shown at 34, Figs. 2, 5, and 6. By having the tripping-lever and the spring-lever thus pivoted and linked with reference to each other the force of the spiral spring Y is so exerted upon the lifting-lever as to cause but a minimum of pressure upon the face 37″ of a notch in a trigger-lever 37, which controls the movement of the tripping-lever X. This trigger-lever 37 is pivoted upon a stud 38, which is screwed into the spring-lever bracket 33. The spiral spring 39 is attached to the lower end 37′ of the trigger-lever 37 at one end. The other end of the spiral spring 39 is attached to a stud 40, which is screwed into the bracket 33. This trigger-spring 39 causes the trigger-lever 37 to press forward against the end $X^2$ of the tripping-lever X when the latter is down and securely holds it in that position in a notch 37″ until the trigger-lever is tripped away from said end $X^2$ of the tripping-lever by the movement of a cam 41, which is pivoted on a rock-shaft 42, with which it oscillates. Said cam prevents the trigger-lever from moving too far forward and limits the motion of the trigger-lever in that direction, while the limiting-stud 43 prevents unnecessary backward motion of the trigger-lever. The upper end 37‴ of the trigger-lever 37 is provided with a handle by which the tripping-lever can be tripped by hand and the machine be made to strike the bell manually instead of electrically.

The rock-shaft 42 is mounted upon two standards 44 45 and is journaled therein at its ends. Said standards are secured to the bed of the machine by bolts 46 47 46′ 47′. The rock-shaft 42 has an escapement-lever 48, which is pinned thereto, and is provided at its free end with an escapement-pin 49, which plays upon the escapement-pallets 50 51, which are upon the free end of the armature-carrier 52. The armature-carrier 52 is provided with a shaft which is trunnioned in the usual manner of shafts of armature-carriers of electro-magnets, which can be readily understood without further illustration or description.

The armature-carrier 52 supports the armature 53 of an electro-magnet 53′, which is provided with means of adjustment and attachment similar to those of ordinary electro-magnets for like purposes and needs no further description. The base 54 of the electro-magnet 53′ is secured to the bed G of the machine by means of screws 55 56, thus holding it in a permanent position with reference to the rock-shaft 42, with which the escapement-lever 48 oscillates. In order that the pressure of the escapement-pin 49 upon the armature-carrier pallets 50 51 may be at a minimum degree, and also in order that the cam 41 may strike the trigger-lever 37 with a force sufficient to trip the trigger-lever 37 away from the end $X^2$ of the tripping-lever X, and thus allow the latter to trip the pawl T free from the stop projection $L^3$ and allow the machine to strike a blow, the escapement-lever 48 is provided with an arm 48′, which is pivoted to a connecting-lever 57, which in turn is pivoted to the end 58′ of a flat tension-spring 58. Said tension-spring is provided with an elongated hole 58″ at its large end, through which the set-screws 59 60 pass, and by which it is secured to the bed of the machine. The pivoted end 58' of the tension-spring 58 exerts an upward pressure through the connecting-lever 57 upon the escapement-lever arm 48', and causes the rock-shaft 42, together with all the levers and parts connected therewith, to assume the position shown in Fig. 13 when the escapement-pin 49 clears the pallets 50 51. This method of connecting the tension-spring 58 with the rock-shaft 42 embodies the mechanical principle of the toggle-joint, so that when the parts are in the position shown in Fig. 12 the pressure of the escapement-pin 49 can be adjusted to a minimum by the proper adjustment of the tension-spring 58 with the set-screws 59 60. While in this position almost all the upward pressure of the tension-spring is exerted upon the rock-shaft journals in the standards 44 45, only enough of pressure is allowed on the escapement-pin to insure its clearance of the pallets 50 51 when the armature is attracted by the magnets in the usual manner; but when the escapement-pin clears the pallets and reaches the position indicated by the dotted lines in Fig. 6 at 61, the pressure of the tension-spring has increased the momentum of the rock-shaft 42 with all the parts thereon. This momentum increases as the rock-shaft rotates until the latter assumes the position shown in Fig. 13, when the spring exerts its maximum force toward the rotation of the rock-shaft. By this arrangement of the parts the cam 41 can be made to strike a powerful blow upon the trigger-lever 37 and insure the rapid and certain release of the tripping-lever X, and at the same time the pressure of the escapement-pin 49 upon the armature-carrier pallets 50 51 can be maintained at a minimum, thus requiring very little battery-power to operate the electro-magnet.

The rock-shaft 42 has a restoring-lever 62 secured thereto for the purpose of restoring the escapement-lever 48, with its pin 49, and the cam 41 to their normal position, as seen in Figs. 5 and 12. A stud 63 is inserted in the side of the main-lever quadrant near its upper extremity $L^5$, which impinges against the rock-shaft restoring-lever 62, and as the main lever L moves forward and downward causes the rock-shaft to assume its original position again by carrying the rock-shaft restoring-lever 62 before it until the escapement-pin 49 rises between and above the armature-carrier pallets 50 51, Figs. 12 and 13, which is the extreme position to which the restoring-stud 63 is capable of bringing the escapement-pin and the other parts connected with the rock-shaft 42. When the restoring-stud 63 returns to its normal position with the main lever L, the rock-shaft 42 remains in its normal position, being detained by reason of the escapement-pin 49 resting upon either one of the pallets 50 51, according to the position of the armature-carrier at the time, thus leaving the magnet ready for the next electrical impulse.

In order to prevent the rock-shaft 42 from getting on a dead-center with reference to the tension-spring 58, an L-shaped limiting-lever 64, having a lateral stop projection on each of its ends 64' 64", is secured to the rock-shaft 42. These stop projections strike against the edge of the rock-shaft standard 45, as seen in Figs. 12 and 13 at 45' 45", and thus prevent excessive rotation of the rock-shaft 42 in either direction.

The main-lever quadrant has an arc-shaped piece 65 secured thereto by means of bolts 66 67, and having a stud 68, upon which a tripping-lever restorer 69 is pivoted at one end. The free end 69' of the restorer 69 is provided with a tripping-lever restoring-pin 70, which is supported by a guide-lever 71, which is pivoted upon the pawl-shaft V. This restoring-pin 70 strikes against the tail-piece $X^4$ of the tripping-lever X and carries the tail-piece forward with it in the downward movement of the main lever, and consequently restores the tripping-lever X from the position which it assumes after having been tripped, as shown in Fig. 6, to its normal position, as shown in Fig. 5, where it is ready to be tripped again.

The normal position of the restorer 69 is shown in Figs. 3 and 5 as being far enough away from the tail-piece $X^4$ of the tripping-lever X as not to cause said tail-piece $X^4$ to strike the restoring-pin 70 when the tripping-lever is tripped, as the tail-piece moves forward only enough to lift the pawls T U clear of the stop projections $L^3$ $L^4$. The further upward motion of the tripping-lever is arrested by reason of the tail-piece $X^4$ coming against a detent 72, which is secured to the bed of the machine by means of a bolt 73.

The position of the tripping-lever restoring mechanism in Fig. 6 shows the restoring-pin as just coming in contact with the tail-piece of the tripping-lever in the downward movement of the main lever, while the position shown by the dotted lines in Fig. 5 shows the restorer as having thrown the tail-piece forward and having restored the tripping-lever to its normal position and ready for another blow. It will be noticed that the restoring-pin 70, the stud 68, and the center of the main-lever-shaft end are in a straight line, which position determines the limit to which the tripping-lever is brought down, while the main lever can move still farther down to an indefinite limit, which is variable according to the oscillations of the hammer-lever P, which oscillations practically determine the extreme limits of motion of the main lever L. It will also be noticed that the rock-shaft mechanism and the tripping-lever mechanism are both restored to their normal positions and the tripping-lever caught by the trigger-lever ready for the next electrical impulse by the downward movement of the main lever L— that is, while the hammer is being drawn back from the bell preparatory to giving a stroke thereon, so that the entire force of the weight is expended alone upon the forward propulsion of the hammer against the bell during the upward stroke of the main lever L. In other words, there is none of the power of the weight lost (except that incidental to friction) in restoring any of the mechanism of the machine while the hammer is delivering its blow upon the bell if the hammer mechanism is properly balanced, as it should be.

The mainspring Y of the tripping-lever mechanism accelerates the movement and increases the pressure of the tripping-lever against the pawl T, as the pins $X^3$ and $Z'$ and the center of the pawl-shaft V and the center of the spring-lever shaft $Z^2$ are almost in a straight line normally to minimize the pressure of the end $X^2$ of the tripping-lever X upon the trigger-lever 37, that the latter may be tripped easily when the tripping mechanism is in its normal position; but when the tripping-lever is released by the trigger-lever the two ends of the mainspring assume a more oblique position with reference to the spring-lever shaft and the pawl-shaft, which allows a rapidly-increasing and more powerful upward pressure to be brought upon the tripping-lever to enable the latter to trip the pawl T and release the main lever as rapidly as possible. The upward pressure exerted by the contraction of the spring upon the tripping-lever increases notwithstanding the loss of energy incidental to the contraction of the spring, on account of the manner in which the several centers of shafts and pins change their position with reference to each other. In other words, the upward pressure of the tripping-lever is at its minimum when in the position shown in Figs. 3 and 5, and this pressure increases as the tripping-lever rises until it assumes the position shown in Fig. 6, when it attains its maximum force, notwithstanding the fact that the spring has lost some of its power by the contraction of its coils in the change of its position. The tripping-lever and the mainspring lever are linked together so as to throw the end of the latter up as quickly as possible to obtain this accelerated upward pressure upon the main pawl T to insure its certain and rapid release from the main-lever stop projection.

The certain and rapid release of the detent mechanism of bell-striking machines has heretofore been very difficult of accomplishment, requiring great nicety of fit, adjustment, and lubrication, which the mechanism herein shown and described is intended to obviate. To prevent the mainspring from getting on a dead-center, I provide a block 74, which is secured to the bed of the machine, as seen in Figs. 2 and 4.

As a means of adjustment for the mainspring, the spring-lever can be provided with adjustment-holes $Z^4$ $Z^4$ $Z^4$, (shown in Fig. 7,) into one of which the spring-pin $Z'$ can be inserted according to the tension required.

As a means of winding up the weight when it has run down, the shaft E is provided with a gear-wheel 75, which is keyed upon the shaft E. A pinion-stud 76 is secured to the bed of the machine by means of a block 77 and bolts 78 79, as shown in Fig. 2. Upon the pinion-stud 76 the pinion 80, having a crank-handle 80', is placed, where it fits in the gear-wheel, when the weight can be wound up as desired and the winding-pinion removed from the stud again for convenience.

While a person would be in the act of winding up the machine a signal might be sent through the magnet and cause the mechanism to be tripped and to some extent interfere with the careful winding up of the machine. As a safeguard against such a contingency, the pawl-shaft holder W is provided with a safety-lug $W^5$, Figs. 2 and 3, having a hole $W^6$, into which the safety-pin 81 can be inserted. When the safety-pin is thus inserted, the spring-lever is securely locked down, and although the trigger-lever should be tripped by the magnet or by hand the tripping-lever will remain unaffected until the safety-pin is removed from its hole, thus insuring non-interference with the person winding the machine. This safety-pin may be attached to the machine by a chain 82, as shown in Fig. 1.

In Fig. 2 the pallet-wheel I is shown of a slightly-increased diameter, and in Fig. 3 the pallet-wheel is also similarly shown with the pallets K K' and the pallet-rest M slightly lowered below the bed of the machine as compared with the other views. This is done for the purpose of more clearly illustrating the action and relative position of the parts of the pallet mechanism. A set-screw 83 binds the main lever L in position upon the main-lever shaft N.

The end of the bed of the machine is cut away up to the point 84 to allow the main lever L to rise high enough in its upstroke, as shown by the dotted lines in Figs. 8 and 9.

In Fig. 1, B represents a wire cable or rope. A chain may be substituted therefor, which could be wound upon the drum similar to the rope, or else a sprocket-wheel having sprockets to fit the links of the chain could be substituted for the drum, if desired.

The operation of the machine may be described as follows: The machine being wound up and at rest and the position of the mechanism being normally as shown in Figs. 1, 2, 3, 5, 8, 10, and 12, the impulse of an electric current representing a signal is sent through the electro-magnet 53', which electric impulse attracts the armature 53, with its carrier 52, which releases the escapement-pin 49 and allows the rock-shaft mechanism to assume the position shown in Figs. 6, 11, and 13. The rock-shaft mechanism is thrown into this position by the upward pressure of the tension-spring 58. It will be noticed that the point 41' of the cam 41, as seen in Fig. 5, is some distance away from the trigger-lever 37, which allows the rock-shaft mechanism to acquire momentum, so that the trigger-lever may be struck by the cam with accumulated force—of the nature of a blow—to insure the certain release of the trigger from the end $X^2$ of the tripping-lever X. The tripping-lever X, being thus free, is at once thrown upward by the mainspring Y into the position shown in Fig. 6, carrying with it the pawls T U, leaving the main lever L free to make its downward stroke, assuming the positions shown in Figs. 6, 9, and 11. In Fig. 17 a space 85 is shown between the lifting-lug T' of the pawl T and a shoulder X' of the tripping-lever X. This clearance is for the purpose of allowing the tripping-lever X to accumulate some momentum, so as to strike the lifting-lug T' of the pawl T a smart blow in order to overcome any friction between the end of the pawl T and the face of the corresponding stop projection $L^3$ of the main lever L. The increasing upward pressure of the tripping-lever X, transmitted to the pawl T as the tripping-lever moves upward and as caused by the mainspring mechanism, as already described, insures a rapid and certain tripping of the pawl T. The main lever L, being free to move, is propelled downwardly by the power of the suspended weight transmitted through the pallet-wheel I and the short pallet K. As the main lever L moves downwardly, the rock-shaft restoring-stud 63 comes against the restoring-lever 62, as shown by the dotted lines at 63', Fig. 11, and as said stud 63 moves forward with the main lever L it carries the restoring-lever 62 with it, thus restoring the rock-shaft mechanism to its normal position, the escapement-pin 49 being thrown above the pallets 50 51 of the armature-carrier 52, and at the same time the cam 41 being thrown into its normal position, as shown in Fig. 5, leaving the trigger-lever 37 free to catch the end $X^2$ of the tripping-lever X at 37'', when the latter is brought down into locking position therewith by the action of the tripping-lever restoring mechanism, as already described. While the main lever L is thus making its downward stroke, it is drawing the hammer away from the bell preparatory to its giving a blow thereon. As the main lever L is making its downward stroke, the long pallet K' moves backward and upward until it strikes against an oncoming tooth of the pallet-wheel, assuming a position similar to that shown in Figs. 9 and 11 when both of the pallets are in contact with the pallet-wheel teeth—a position not shown in the drawings, but which can be readily understood. If the moving parts of the machine and the hammer mechanism had acquired no momentum, the pallets K K' would lock the pallet-wheel in such a position as above described, and the machine would become inoperative; but the momentum acquired by the downstroke of the main lever and the back-stroke of the hammer-lever mechanism carries the short pallet K away from contact with the tooth of the pallet-wheel which had propelled it forward and throws the long pallet K' backward, which slightly reverses the pallet-wheel, the pallet mechanism assuming the position shown in Figs. 9 and 11, when the short pallet, having no longer a contact with the pallet-wheel tooth which propelled it, drops down by its own gravity clear of the pallet-wheel tooth upon the pallet-rest, as shown in these two figures. The pressure of the pallet-wheel tooth, acting upon the main lever through the long pallet K', quickly arrests the further downward movement of the main lever L and the backward movement of the hammer mechanism and causes the hammer-lever mechanism and the main-lever mechanism to reverse their respective motions, thereby causing the hammer to strike the bell with great force. In the upward stroke of the main lever the inclined back of the stop projection $L^3$ lifts the pawl T up, carrying with it the pawl U, so as to prevent the latter from catching against the corresponding stop projection $L^4$ of the main lever L when the latter is making its upward stroke. The under surface of the hook-shaped pawl U is about one-eighth of an inch higher than the under surface of the straight pawl T, as shown at 86 in Fig. 17. This construction prevents the hook-shaped pawl U from dropping down and catching against the stop projection $L^4$ when the main lever is making its main upstroke, as on account of the comparatively quick movement of the stop projections in passing the pawls the hook-shaped pawl U cannot drop down quick enough—the eighth of an inch distance aforesaid—in time to catch the passing stop projection $L^4$, being held up through the pin U' by the straight pawl T, which is resting upon the inclined surface of the stop projection $L^3$ at the time. The main lever therefore moves forward with an unobstructed movement, so far as the pawls are concerned, until its motion is arrested by the hammer striking against the bell. The stroke of the hammer against the bell causes the hammer and all the mechanism connected therewith to rebound or move back suddenly. In the meantime the short pawl T, having dropped down into its normal position, has also allowed the hook-shaped pawl U to become free and ready to assume its normal position when the main stop projection $L^3$ strikes against the straight pawl T. The end of the hook on the pawl U rests upon the incline of the stop projection $L^4$ (shown by the dotted lines in Figs. 10 and 11) when the hammer strikes the bell, and as the main lever moves forward again in its secondary or rebounding forward movement the inclined surface of the stop projection $L^4$ slowly lifts the hook-shaped pawl up until said stop projection passes the hook of said pawl, when the other stop projection $L^3$ arrests the further forward movement of the main lever, as seen in Fig. 8. When this position is reached, the hook-shaped pawl U, having nothing to support it, falls down into its normal position, as seen in Fig. 10, and prevents any further movement of the main-lever and hammer-lever mechanism, and the machine becomes ready for a repetition of all these operations in striking another blow. The faces of the stop projections $L^3$ $L^4$ are in a line with each other parallel to the main-lever shaft, although in Fig. 10 they are shown slightly out of line for the purpose of clearness in illustration. The bearing-surfaces of the pawls and stop projections are turned radially with the center of the pawl-shaft V, that the pawls may be easily tripped. The pawls T U are loosely fitted upon the pawl-shaft V, and when unobstructed by the tripping-lever they fall down into their normal positions by gravity. The quadrant-shaped part $L^6$ of the main lever L passes between the two pawls T U without touching them, as shown by the dotted lines in Fig. 16. The shaft N is journaled in boxes of the usual construction, one of which is shown at N', Fig. 9, and which are secured to the bed G of the machine by bolts 26' 26'.

The escapement-pallets 50 51 in Figs. 12 and 13 are shown as arranged for an open-circuit machine; but the escapement mechanism can also be arranged so that the machine will work on a closed circuit equally as well. A mere reversal of the positions of the escapement-pallets, as is well known, is all that is necessary to accomplish this result.

Having thus described my invention, what I claim, and desire to secure by Letters Patent, is—

1. In an electro-mechanical bell-striking machine, the combination of a main shaft having a winding-drum provided with a ratchet-wheel, a pallet-wheel provided with pivots carrying pawls adapted to engage with the teeth of said ratchet-wheel, and springs to keep said pawls engaged with said ratchet-wheel teeth, two pallets pivoted at one end to a main lever, the free ends of said pallets being adapted to engage with the teeth of said pallet-wheel and being provided with spurs, a pallet-rest adapted to support said spurs and guide said pallets against the teeth of said pallet-wheel, a main-lever shaft provided with bearings, a quadrant-shaped main lever pivoted upon said main-lever shaft and being provided with a pivot-hole at its free end, and having two stop projections and a rock-shaft restoring-stud, two pawls adapted to engage with said main-lever stop projections, a tripping-lever adapted to trip said pawls, being provided with a restoring tail-piece and a spring-stud, a tripping-lever mainspring, a mainspring-lever provided with a mainspring-stud and pivoted at one end and provided with a link-arm, a bracket having bearings in which said mainspring-lever is pivoted, links connecting said tripping-lever to the arm of said spring-lever, a trigger-lever pivoted upon a stud in said spring-lever bracket and having a notch adapted to engage with the end of said tripping-lever, a trigger-lever spring connected with said trigger-lever and a stud in said spring-lever bracket, a rock-shaft provided with two journals and having thereon a cam, a restoring-lever, an escapement-lever provided with an escapement-pin at its free end and a limiting-lever, an adjustable tension-spring having a toggle-jointed connection with said rock-shaft, two standards having bearings for the journals of said rock-shaft, an electro-magnet provided with screws for adjustment and support, an armature-carrier having escapement-pallets and an armature, a winding-gear fitted upon the main shaft of the machine, a winding-pinion provided with a crank-handle, and a pinion-stud which is secured to the bed of the machine, so as to support said pinion in gear with said winding-gear, all of which are mounted upon a suitable bed provided with legs, substantially as described.

2. In an electro-mechanical bell-striking machine provided with a winding-drum shaft, a winding-drum, a pallet-wheel, a main lever, and pallets pivoted thereto and adapted to engage with the teeth of said pallet-wheel, the combination of a quadrant-shaped extension to said main lever having stop projections thereon, two pawls adapted to engage with said stop projections, a pivoted tripping-lever provided with a mainspring, a pivot-shaft upon which said pawls and tripping-lever are pivoted, and a trigger-lever adapted to engage with the end of said tripping-lever and provided with a spring, substantially as described.

3. In an electro-mechanical bell-striking machine provided with a winding-drum shaft, a winding-drum, a pallet-wheel, a main lever, and pallets pivoted thereto and adapted to engage in said pallet-wheel, the combination of an arc-shaped extension to said main lever carrying a restoring-lever stud, a restoring-lever pivoted upon said stud and being provided with a restoring-pin at its free end, a guide-lever pivoted at one end and carrying said restoring-pin, a tripping-lever pivoted at one end and provided with a restoring tail-piece, a shaft upon which said guide-lever and tripping-lever are pivoted, and a pivoted trigger-lever provided with a notch adapted to engage with the end of said tripping-lever and having a spring, substantially as specified.

4. In an electro-mechanical bell-striking machine provided with a winding-drum shaft, a winding-drum, a pallet-wheel, a main lever, and pallets pivoted thereto and adapted to engage in said pallet-wheel, the combination therewith of a quadrant-shaped main-lever extension having stop projections thereon and a rock-shaft restoring-pin, two pivoted pawls adapted to engage with said stop projections, a pivoted tripping-lever provided with a mainspring-pin and a mainspring, a pivoted trigger-lever having a notch adapted to engage with the end of said tripping-lever and being provided with a spring, a rock-shaft provided with a cam adapted to release said trigger-lever from its engagement with said tripping-lever, and being provided with an escapement-lever carrying an escapement-pin adapted to engage with the escapement-pallets on the free end of an armature-carrier of an electro-magnet, and being provided with a toggle-jointed connection to an adjustable tension-spring, and being provided with a limiting-lever adapted to limit its rotation, and being provided with a restoring-lever, which, by coming in contact with a restoring-lever stud in said quadrant-extension of said main lever, restores the rock-shaft mechanism to its normal position, substantially as specified.

5. In an electro-mechanical bell-striking machine having a rock-shaft provided with a cam adapted to release the trigger mechanism of said machine, the combination, with said rock-shaft, of an adjustable tension-spring having a toggle-jointed connection therewith, substantially as specified.

6. In an electro-mechanical bell-striking machine having a main lever provided with stop mechanism adapted to be tripped by means of a pivoted tripping-lever, the combination, with said tripping-lever, of a spiral spring connected with the free end of said tripping-lever by means of a spring-pin, and a mainspring-lever, which is also connected to said mainspring by means of a pin, said spring being pivoted at one end and having an arm projecting from its pivot-shaft, which is linked by means of links and pins to the tripping-lever, substantially as described.

7. In an electro-mechanical bell-striking machine provided with a main-lever stop mechanism, a quadrant-shaped main lever provided with stop projections by which it is adapted to be locked in its normal position by said stop mechanism, substantially as specified.

8. In an electro-mechanical bell-striking machine having a main lever provided with stop mechanism, and having a tripping-lever adapted to release said main lever, and having a mainspring-lever connected with said tripping-lever, the combination of said mainspring-lever with a lug having a hole therein, and a pin adapted to fit in said hole for the purpose of preventing the premature operation of the machine by an unexpected signal sent through the electro-magnet while the machine is being wound up, substantially as specified.

THOMAS F. GAYNOR.

Witnesses:
E. H. STEPHENS,
T. F. O'BRIEN.